3,517,000
ALPHA-AMINOMETHYL BENZYL ALCOHOLS

William F. Bruce, Havertown, Pa., assignor to American Home Products Corporation, New York, N.Y., a corporation of Delaware
No Drawing. Original application Oct. 22, 1965, Ser. No. 502,370. Divided and this application Aug. 8, 1968, Ser. No. 751,027
Int. Cl. C07d 87/40
U.S. Cl. 260—247.5          5 Claims

ABSTRACT OF THE DISCLOSURE

Aralkylamines are prepared by the reaction of styrene oxide with certain alicyclic, lower alkoxyalkyl, amino-(lower)-alkyl, aralkyl, and morpholino(lower)alkyl(hydroxyaralkyl) amines for a relatively short period of time. The products are pharmacologically active as anticonvulsants.

---

This application is a division of application Ser. No. 502,370, filed Oct. 22, 1965, now abandoned.

This invention relates to aralkylamine derivatives and the method for producing them. More particularly, the invention involves certain secondary hydroxyaralkylamines having useful pharmacological activity.

The compounds sought to be patented are those which may be represented by the general formula:

R′NH—R where R represents either a diphenyl(lower)alkyl, or morpholino(lower)alkyl where the alkyl moiety has from 1 to 2 carbon atoms, a (lower)alkoxy(lower)alkyl or a di(lower)alkylamino(lower)alkyl with the alkyl groups in the last two radicals ranging from 1 to 3 carbon atoms. The radical R′ is intended to represent a beta-hydroxy-beta-phenylethyl radical.

The compounds falling within the scope of the invention have been found to possess central nervous system depressant activity when tested pharmacologically under experimental and scientifically acceptable testing procedures in mice, showing particularly anticonvulsant action in these animals.

The secondary amines of the invention are prepared by reacting styrene oxide with a selected amine of the formula RNH₂, wherein R has the significance as previously indicated. The reaction is carried out in an alcoholic solvent, preferably ethanol, at about steam bath temperature for a period up to 3 hours. This will yield the secondary amine.

The following examples are intended primarily as illustrative of the best mode for carrying out the invention. It is to be understood that the quantities and temperatures are in the metric system.

EXAMPLE 1

α-([2-(dimethylamino)propyl]aminomethyl)benzyl alcohol

A solution of 12 g. of styrene oxide and 11 g. of N²,N²-dimethyl-1,2-propanediamine in 30 ml. of ethanol was allowed to stand overnight and then heated 3 hours on a steam bath. It was concentrated on a water pump to give a yellow sirup, which on standing overnight began to crystallize in long needles, which were collected on a filter and recrystallized from methyl acetate-heptane to give 1 g. of product.

Analysis.—Calcd. for $C_{13}H_{22}N_2O$ (percent): C, 70.23; H, 9.97; N, 12.60. Found (percent): C, 70.11; H, 10.12; N, 12.32.

This compound when tested as previously indicated, showed similar anticonvulsant activity when given orally in a single dose in the range of 200–400 mg./kg.

EXAMPLE 2

α-[(2-morpholinoethyl)aminomethyl]benzyl alcohol

A solution of 15 g. of styrene oxide and 13 g. of N-(aminoethyl) morpholine in 70 ml. of absolute ethanol stood overnight and was then concentrated and distilled to give 10 g. of colorless oil b.$_{0.3}$ 170–5°. The product became solid and was recrystallized from methyl acetate-hexane to give 3 g. of white crystals m. 107–8°.

Analysis.—Calcd. for $C_{14}H_{22}N_2O_2$ (percent): C, 67.17; H, 8.86; N, 11.19. Found (percent): C, 66.97; H, 8.63; N, 10.85.

Using the compound in the experiments as previously indicated (anticonvulsant test) it demonstrated such action at a single oral dose in the range of 200–400 mg./kg.

EXAMPLE 3

α-[(2-ethoxyethyl)aminomethyl]benzyl alcohol

A solution of 16 g. of styrene oxide and 10 g. of 2-aminodiethylether in 40 ml. of absolute ethanol stood 3 days at room temperature, and was then concentrated and distilled to give 9 g. b.$_{0.3}$ 1350–40° of the title product as a colorless oil, which on redistillation gave 5 g. b.$_{0.1}$ 130–135°.

Analysis.—Calcd. for $C_{12}H_{19}NO_2$ (percent): C, 68.86; H, 9.15; N, 6.69. Found (percent): C, 68.24; H, 9.34; N, 6.63.

On pharmacological experimentation the compound was found to control tonic convulsions (anti-metrazol activity) in mice at a single dose (oral) of 70 mg./kg.

EXAMPLE 4

α-[(1,2-diphenylethyl)aminomethyl]benzyl alcohol

A mixture of 12 g. of styrene oxide and 20 g. of 1-amino-1,2-diphenylethane stood at room temperature for 3 days and was heated overnight on a steam bath. On solution in ether and addition of HCl in ether, 30 g. of white solid separated. Recrystallized from ethanol, this gave 20 g. of white powdery solid m. 216–7° and a filtrate which became blue on contact with air. The desired solid product analyzed for:

Analysis.—Calcd. for $C_{22}H_{23}NO \cdot HCl$ (percent): C, 74.68; H, 6.84; Cl, 10.02; N, 3.96. Found (percent): C, 74.92; H, 6.58; Cl, 10.0; N, 3.92.

This compound when submitted to similar experimental procedures showed anticonvulsant activity with an oral dose in the range of 100–200 mg./kg.

The compounds of the invention may be utilized either as the free base or in the form of nontoxic or pharmaceutically acceptable, acid-addition salts. The latter are prepared from organic or inorganic acids by reacting the bases with the selected acid substance in well-known manner, one method being exemplified above. Examples of acids which may be used, in addition to that already disclosed, are sulfuric, phosphoric, hydrobromic, acetic, fumaric, maleic, tartaric, or the like.

To prepare the compounds in dosage forms, they may be combined with various solid or liquid extenders, carriers or excipients, depending on whether they are to be used orally or parenterally. Oral forms may be prepared in the form of tablets, capsules or liquid suspensions. For parenteral applications, compositions may be prepared in an aqueous or oleaginous vehicle. Physiological effects for the various compounds of the invention are achieved at a dosage range from 10 to 400 mg./kg. of body weight.

The invention claimed is:
1. A compound of the formula:

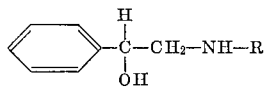

in which R is a member of the group consisting of morpholinoethyl, ethoxyethyl, 1,2-diphenylethyl, and 2-(dimethylamino)propyl.

2. A compound of claim 1; α-([2-(dimethylamino)-propyl]aminoethyl)benzyl alcohol.

3. A compound of claim 1; α-[(2-morpholinoethyl)-aminomethyl]benzyl alcohol.

4. A compound of claim 1; α-[(2-ethoxyethyl)aminomethyl]benzyl alcohol.

5. A compound of claim 1; α-[(1,2-diphenylethyl)-aminomethyl]benzyl alcohol.

References Cited

UNITED STATES PATENTS 2,046,946  7/1936  Heilner _____ 260—570.6
3,225,096  12/1965  Mills et al. _____ 260—570.5

ALEX MAZEL, Primary Examiner
J. TOVAR, Assistant Examiner

U.S. Cl. X.R.

260—570.6; 424—248; 330